US011078012B2

(12) United States Patent
Aston

(10) Patent No.: US 11,078,012 B2
(45) Date of Patent: Aug. 3, 2021

(54) CAP FOR REFILLABLE TOTE

(71) Applicant: NCH Corporation, Irving, TX (US)

(72) Inventor: Matthew David Aston, Fort Worth, TX (US)

(73) Assignee: NCH Corporation, Irving, TX (US)

( * ) Notice: Subject to any disclaimer, the term of this patent is extended or adjusted under 35 U.S.C. 154(b) by 193 days.

(21) Appl. No.: 15/883,217

(22) PCT Filed: Jul. 29, 2016

(86) PCT No.: PCT/US2016/044631
§ 371 (c)(1),
(2) Date: Jan. 30, 2018

(87) PCT Pub. No.: WO2017/019931
PCT Pub. Date: Feb. 2, 2017

(65) Prior Publication Data
US 2018/0319587 A1  Nov. 8, 2018

Related U.S. Application Data

(60) Provisional application No. 62/198,793, filed on Jul. 30, 2015.

(51) Int. Cl.
*B65D 90/48* (2006.01)
*B65D 90/54* (2006.01)
*B65D 77/04* (2006.01)
*G01F 23/18* (2006.01)
*B01D 53/04* (2006.01)
(Continued)

(52) U.S. Cl.
CPC ......... *B65D 90/48* (2013.01); *B01D 53/0415* (2013.01); *B01D 53/261* (2013.01); *B65D 77/0466* (2013.01); *B65D 77/061* (2013.01); *B65D 90/54* (2013.01); *G01F 1/36* (2013.01); *G01F 23/14* (2013.01); *G01F 23/18* (2013.01); *G01S 19/13* (2013.01); *B01D 2259/4525* (2013.01); *B65D 2590/0083* (2013.01)

(58) Field of Classification Search
CPC . G01F 1/36; G01F 23/14; G01F 23/18; B65D 90/48–513
See application file for complete search history.

(56) References Cited

U.S. PATENT DOCUMENTS 4,146,277 A   3/1979  Santoro
4,199,983 A * 4/1980  Kobayashi .............. G01F 23/14
                                                                  73/302
(Continued)

FOREIGN PATENT DOCUMENTS

EP   1363082 A1   11/2003

OTHER PUBLICATIONS

Plastic Pipe and Fittings Association, "PVC Piping Systems for Commercial and Industrial Applications" 2008. (Year: 2008).*
(Continued)

*Primary Examiner* — Paul M. West
(74) *Attorney, Agent, or Firm* — Ramey and Schwaller, LLP; William P. Ramey; Melissa D. Schwaller

(57) ABSTRACT

A cap with refill capability and the ability to track various aspects of the tote, cap, and equipment has been developed for use on chemical totes. It provides the ability to refill the tote without removing the cap and remove water from the fluid and air in the hose.

19 Claims, 3 Drawing Sheets

(51) Int. Cl.
  *B01D 53/26*   (2006.01)
  *B65D 77/06*   (2006.01)
  *G01F 1/36*    (2006.01)
  *G01F 23/14*   (2006.01)
  *G01S 19/13*   (2010.01)

(56) References Cited

U.S. PATENT DOCUMENTS

| | | | | |
|---|---|---|---|---|
| 4,237,739 | A | * | 12/1980 | Owen ................ G01F 1/40 |
| | | | | 73/861.63 |
| 4,548,624 | A | * | 10/1985 | Waller ............... B01D 53/261 |
| | | | | 252/194 |
| 4,999,034 | A | | 3/1991 | Mager et al. |
| 5,575,832 | A | * | 11/1996 | Boyd ................ B01D 53/261 |
| | | | | 55/524 |
| 5,901,887 | A | | 5/1999 | Wark |
| 2006/0032548 | A1 | * | 2/2006 | Cupples ............. G01F 23/164 |
| | | | | 141/95 |
| 2011/0197988 | A1 | * | 8/2011 | Van Vliet ............ B67D 7/04 |
| | | | | 141/1 |
| 2016/0355318 | A1 | * | 12/2016 | Epenetos ........... A47J 41/0088 |

OTHER PUBLICATIONS

Chemtrol Thermoplastic Flow Solutions, "PP Pipe, Valves & Fittings" Sep. 23, 2013. (Year: 2013).*
International Preliminary Report on Patentability dated Feb. 8, 2018, in International Application No. PCT/US16/46631.

\* cited by examiner

CAP FOR REFILLABLE TOTE

RELATED APPLICATIONS

This application is a National Stage Application of PCT/US16/44631, filed Jul. 29, 2016; which claims priority to U.S. Provisional Application No. 62/198,793, filed Jul. 30, 2015; both of which are incorporated by reference herein in their entirety.

FIELD

The disclosure relates generally to an oil and chemical tote. The disclosure relates specifically to a cap for a refillable oil or chemical tote or tank.

BACKGROUND

Totes are used to hold various liquid and granulate chemicals in an industrial setting. The totes are delivered to customers by various methods of transportation. It is important to know the exact location of the tote for logistical purposes. It is economically and environmentally beneficial that the totes are refillable.

It would be advantageous for there to be a cap for a refillable tote that would allow refilling without removal of the cap and decrease the amount of water and other contaminants are present in the chemical, oil, or other fluid. In addition, it would be advantageous if the cap allowed various aspects of the tote to be tracked and fluid level monitored.

SUMMARY

An embodiment of the disclosure is a cap for a tote comprising a bonnet, wherein the bonnet can be threadedly attached to the tote; at least one pipe adapter attached to the bonnet; a fluid-level monitoring fixture located within the at least one pipe adapter; a GPS receiver present within a structure attached to the at least one pipe adapter; a hygroscopic substance present within a structure attached to the at least one pipe adapter; and a connection for refilling the tote attached to the at least one pipe adapter. In an embodiment, the cap further comprises a power source. In an embodiment, the hygroscopic substance is contained within a cartridge. In an embodiment, the hygroscopic substance is a desiccant. In an embodiment, the desiccant is selected from the group consisting of silica gel, diatomaceous earth, activated charcoal, blue gel, calcium sulfate, calcium chloride, zeolites, aluminum gel, and molecular sieves. In an embodiment, the fluid-level monitoring fixture is a differential pressure sensor. In an embodiment, the differential pressure sensor measures the difference between two pressures. In an embodiment, the differential pressure sensor is used to measure fluid levels by comparing the pressure above and below the liquid. In an embodiment, the differential pressure sensor is used to measure the flow rate by measuring the pressure on both sides of a restriction. In an embodiment, the differential pressure sensor measures the pressure differences on both sides of a filter. In an embodiment, the differential pressure sensor is located inside the tote. In an embodiment, the differential pressure sensor is located outside of the tote. In an embodiment, the cap comprises an O ring. In an embodiment, the diameter of the at least one pipe adaptor is selected from the group consisting of 2 inches, 1.75 inches, 1.5 inches, 1.25 inches, 1 inch, 0.75 inches, and 0.5 inches. In an embodiment, the at least one pipe adaptor is comprised of polypropylene. In an embodiment, the at least one pipe adaptor is comprised of polyvinyl chloride. In an embodiment, the fluid-level monitoring fixture monitor is selected from the group consisting of sight glasses, current loops, floats, hydrostatic devices, load cells, magnetic level gauges, capacitance transmitters, time-of-flight measurements, ultrasound, radar, scales, and light. In an embodiment, the cap further comprises an antenna. In an embodiment, the cap further comprises a transmitter. An embodiment of the disclosure is a method of utilizing the cap comprising transmitting of the fluid level in the tote by the transmitter; transmitting of the GPS location of the tote by the transmitter; receiving of the fluid level in the tote by a receiver; receiving of the GPS location of the tote by a receiver; monitoring of the fluid level in the tote; and monitoring of the GPS location of the tote.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
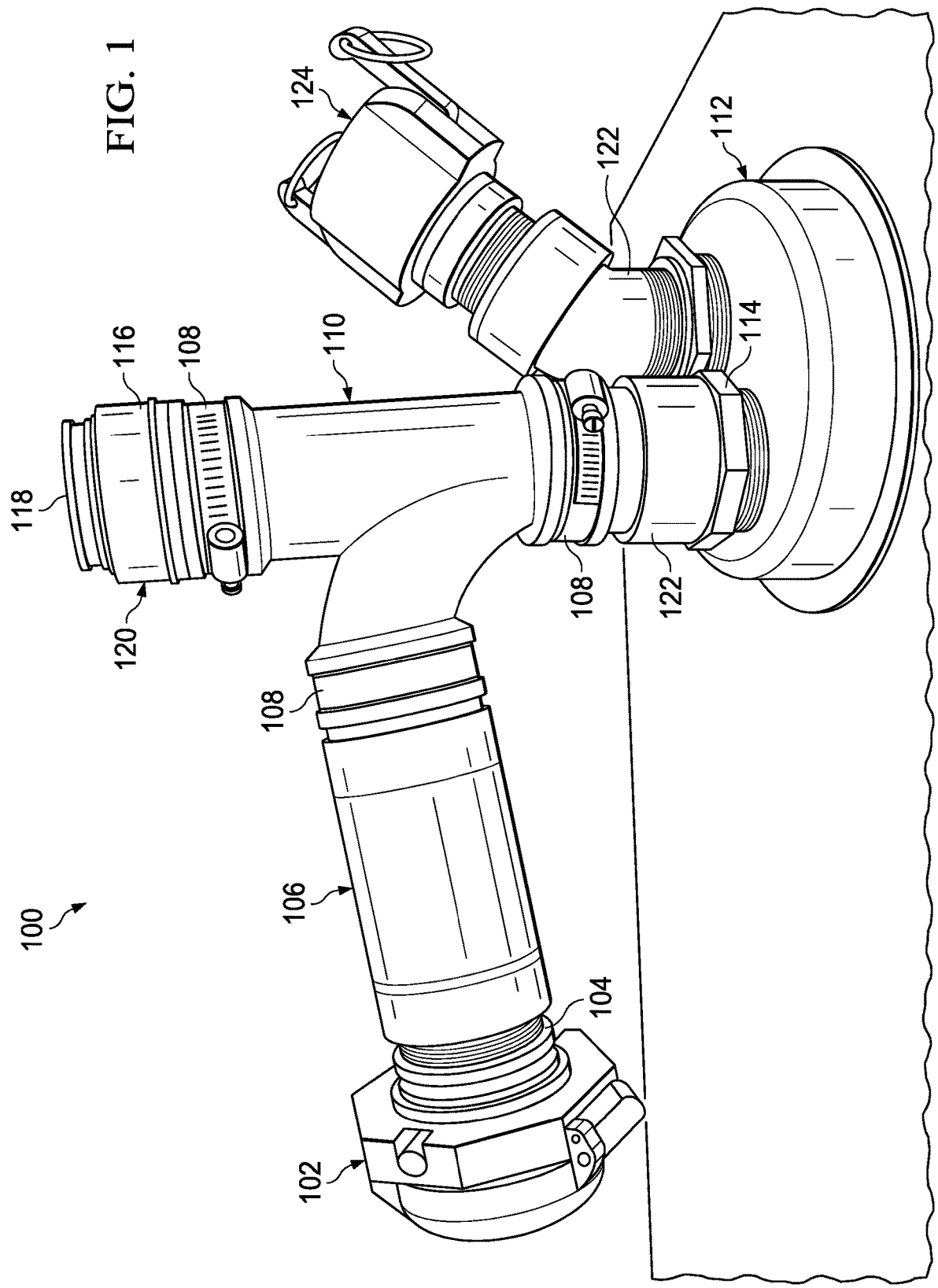
FIG. 1 depicts a configuration for a cap for a refill tank.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "bonnet" means and refers to a protective cover over an object.

As used herein, the term "bung" means and refers to a stopper for closing and securing a hole in a container. In an embodiment, the bung is threaded.

As used herein, the term "bung hole" means and refers to a hole in a barrel, cask, keg, or tank. The hole can be used for draining the liquid from the container. In an embodiment, the bung hole is threaded.

As used herein, the term "desiccant filter" means and refers to a container including a hygroscopic substance that sustains dryness.

As used herein, the term "tote" means and refers an industrial container. In an embodiment, it is a straight-edged cubic or rectangular tank. In an embodiment, it is used for the transport and storage of bulk liquid or granulate substances. In an embodiment, they are mounted on a pallet. In an embodiment, the tote is reusable. In an embodiment, the tote is made of plastic.

A bung hole tote cap fitted with flexible pipe adapters allows for addition of global positioning system (GPS) tracking and a fluid level monitoring fixture with a desiccant filter and a male cam lock fitting with a dust cover allowing for refill into a storage tank from containers. In an embodiment, the bung hole tote cap is 2 inches by 2 inches. In an embodiment, the cap is made of plastic.

The cap of the present disclosure provides the ability to adapt standard packaging into multifaceted capabilities. Tracking of fluid levels, GPS positioning, air filtration, and tank refilling can occur without having to adapt or modify the standard tote packaging.

In an embodiment, the fluid level monitoring fixture is a differential pressure sensor. In an embodiment, the fluid level is tracked by use of a differential pressure sensor. The differential pressure sensor (d/p sensor) measures the difference between two pressures. In an embodiment, the d/p sensor is used to measure fluid levels by comparing the pressure above and below the liquid. In an embodiment, the d/p sensor is used to measure the flow rate by measuring the pressure on both sides of a restriction. In an embodiment, the d/p sensor measures the pressure differences on both sides of a filter. In an embodiment, the d/p sensor is located inside the tote. In an embodiment, the d/p sensor is located outside of the tote.

In an embodiment, the fluid level is tracked by any apparatus suitable for determining the amount of fluid within a tank. Suitable apparatus include but are not limited to sight glasses, current loops, floats, hydrostatic devices, load cells, magnetic level gauges, capacitance transmitters, time-of-flight measurements, ultrasound, radar, scales, and light. In an embodiment, the weight of the tote is monitored to determine the amount of chemical present in the tote. In an embodiment, the fluid is oil. In another embodiment, the chemical is grease. In yet another embodiment, the fluid is a chemical other than oil or grease.

In an embodiment, the pipe adapters are made of polypropylene. In an embodiment, the pipe adapters are made from polyvinyl chloride. In an embodiment, the connections are threaded connections. In an embodiment, the connections are clamp connections. In an embodiment, there are threaded and clamp connections in the apparatus.

In an embodiment, the apparatus contains a hygroscopic substance. In an embodiment, the hygroscopic substance is a desiccant. In an embodiment, the desiccant is silica gel. In an embodiment, the desiccant is diatomaceous earth. In another embodiment, the desiccant is selected from the group consisting of activated charcoal, blue gel, calcium sulfate, calcium chloride, zeolites, aluminum gel, and molecular sieves. In an embodiment, the hygroscopic substance is present within a cartridge. In an embodiment, the cartridge can be changed when the desiccant is consumed. In an embodiment, the hygroscopic substance changes color when it is consumed. In an embodiment, the fluid within the tank passes through the hygroscopic substance. In an embodiment, the fluid passes through the hygroscopic substance when the tank is being filled. In an embodiment, the fluid passes through the hygroscopic substance when the tank is being emptied. In an embodiment, the hygroscopic substance keeps moisture out of the tank.

In an embodiment, the tote cap contains an O ring. In an embodiment, the tote cap does not contain an O ring.

In an embodiment, the pipe size is a diameter selected from the group consisting of 2 inches, 1.75 inches, 1.5 inches, 1.25 inches, 1 inch, 0.75 inches, and 0.5 inches.

In an embodiment, the pipes have at least one outside opening. In an embodiment, the opening has a cap. In an embodiment, the apparatus contains at least one coupler.

The apparatus allows for refill into a storage tank from a container. The apparatus links to software to track the level of fluid in the tank, the battery level, signal strength, and for GPS tracking of the location of the tank. The apparatus surrounds the tubing used to refill the tank. In an embodiment, the tubing is provided by the owner of the tote. In an embodiment, the tubing is fed through the apparatus. In an embodiment, the owner of the tote purchases the apparatus for the tote. In an embodiment, the apparatus allows for on-site refilling of the tote. In an embodiment, the refill is rapid. In an embodiment, rapid is determined to be at a faster rate that the average fill rate. In an embodiment, the refill mechanism utilizes a pump. In an embodiment, the refilling of the tote occurs upon a signal from a sensor monitoring the level of fluid in the tote. In an embodiment, the refilling occurs automatically from a bulk tank. In an embodiment, the tank is manually refilled.

In an embodiment, the cap has the ability to transmit data to a monitoring device over a network. In an embodiment, the data is transmitted wirelessly. In an embodiment, the cap includes an antenna.

In an embodiment, the cap has a power source. In an embodiment, the power source is a battery. In an embodiment, the battery level of the transmitter is tracked remotely by over a network. In an embodiment, the battery level displayed is due to a sensor. In an embodiment, the battery level displayed is a calculation of the expected battery level based upon the battery size, type, charge current, and discharge current. In an embodiment, the power source is an electrical outlet. In an embodiment, the cap includes a cord for providing power to the cap from a source of electricity.

In an embodiment, the signal strength of the transmitter is tracked by monitoring the transmitter over a network.

In an embodiment, the position of the tank is tracked by GPS. A GPS receiver is present within the cap. The position of the GPS receiver is determined in relation to the location of satellites above the GPS receiver. In an embodiment, the location of the GPS receiver is transmitted to a monitoring unit via a network.

In an embodiment, the tote has a national pipe thread (NPT) valve. In an embodiment, the tote has a quick disconnect (cam lock). In an embodiment, the tote has a different style of valve including but not limited to a butterfly valve, ball valve, and check valve.

In an embodiment, the cap allows for addition of various components attached to the pipe adapters. The various hoses and pipes can be labeled to minimize confusion.

In an embodiment, the apparatus is reusable. It can be removed from one tote and placed upon another tote. In an embodiment, the cap is cleaned between uses.

FIG. 1 depicts a cap 100 for a tote. An end cap 102 is threadedly attached to a pipe fitting 104. The pipe fitting 104 connects to one end of a pipe adapter 106. The other end of the pipe adapter 106 is fastened on the inside of a flexible pipe 110 with a hose clamp 108. The flexible pipe 110 is in a y-configuration. Another portion of the flexible pipe 110 is attached to a pipe adapter 122 into the bonnet 112. The pipe adapter 122 comprises a hex nipple 114. The flexible pipe 110 is fastened over the pipe fitting 106 by a hose clamp 108. The bonnet 112 is capable of being threadedly attached to the tote. Yet another portion of the flexible pipe 110 is attached to a pipe fitting 116 with a cover 118 comprising a desiccant 120. In an embodiment, the desiccant 120 can be located elsewhere in the cap 100. Another pipe adapter 122 is inserted into the bonnet 112. The pipe adapter 122 is an elbow configuration. The pipe adapter 122 is also connected to a male cam lock fitting 124 (Banjo). In an embodiment, the cam lock fitting 124 is available in glass injected polypropylene, polypropylene FDA Grade, and stainless steel. In an embodiment, the cam lever coupling includes locking arms, a 90-degree angle, and a 45-degree angle. In an embodiment, the cam lever coupling diameter is 1 inch, 1½ inches, 2 inches, 3 inches, ¾" inch, ⅜ inch, or 4 inches. In an embodiment, a d/p sensor is inserted through the pipe fitting, hose, and bonnet and into the tote.

Figure 2:
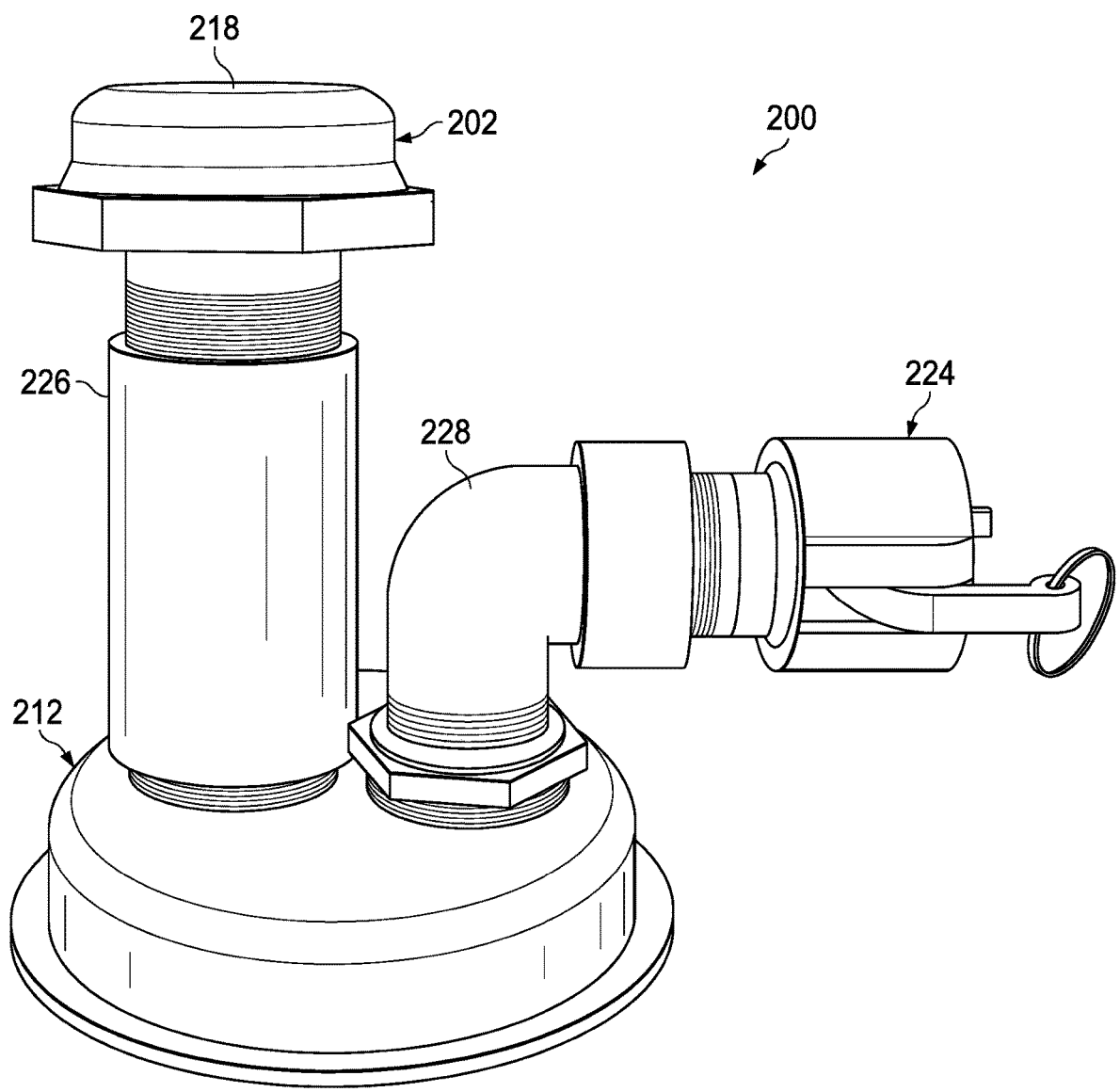
FIG. 2 depicts a configuration for a cap for a refill tank.

FIG. 2 depicts a cap 200 for a tote. Two pipe adapters 226 and 228 are inserted into the bonnet 212. The opposite end of pipe adapter one 226 is attached to an end cap 202 with a cover 218. Pipe adapter two 228 is an elbow configuration. The end of pipe adapter two 228 that is not inserted in the bonnet 212 is connected to a male cam lock fitting 224.

Figure 3A:
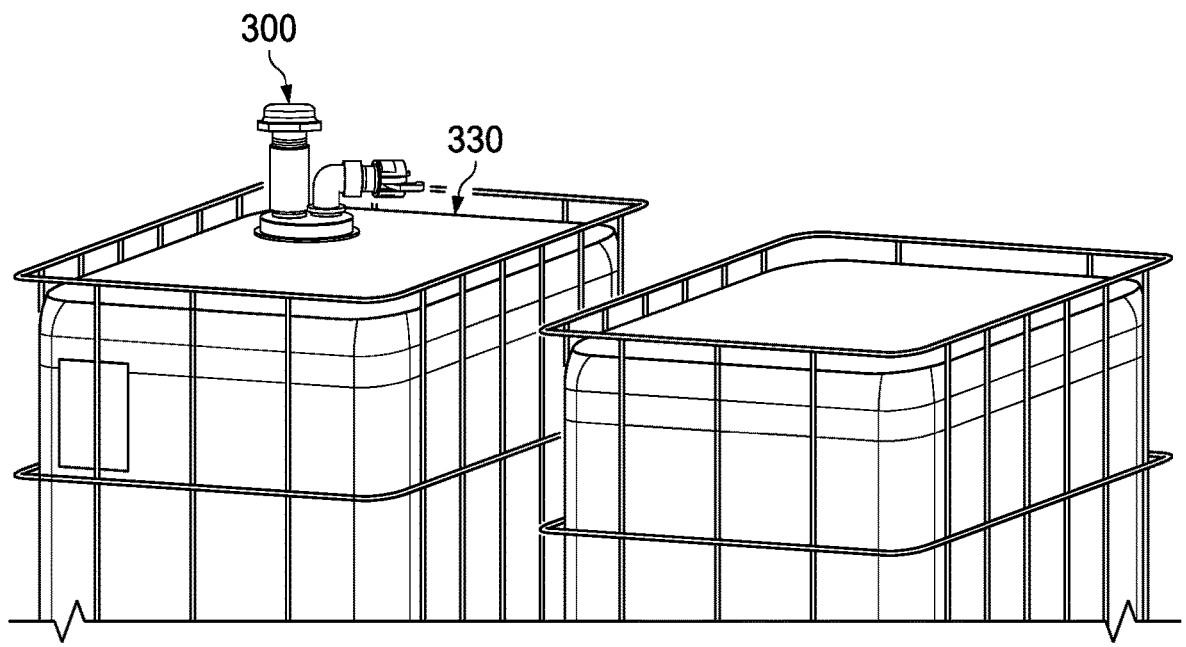
FIG. 3A depicts totes with a cap attached that allows easy refilling and monitoring ability for the tote.

FIG. 3A depicts totes with the cap 300 attached thereto. The cap 300 is visible in the upper left corner of the left tote 330.

Figure 3B:
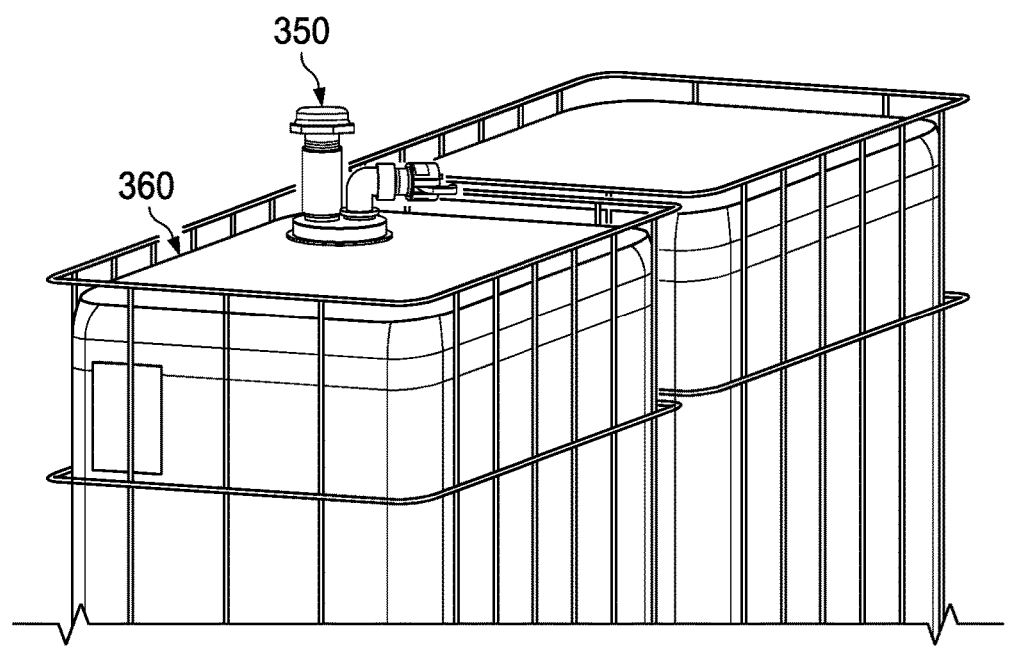
FIG. 3B depicts totes with a cap attached that allows easy refilling and monitoring ability for the tote.

FIG. 3B depicts totes with the cap 350 attached thereto. The cap 350 is visible in the middle of the front tote 360.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are related may be substituted for the substances described herein where the same or similar results would be achieved. All such similar substitutes and modifications apparent to those skilled in the art are deemed to be within the spirit, scope and concept of the disclosure as defined by the appended claims.

What is claimed is:

1. A cap for a tote comprising:
    a bonnet, wherein the bonnet can be threadedly attached to the tote;
    at least one pipe adapter attached to the bonnet;
    a flexible pipe attached to the at least one pipe adapter by at least one hose clamp;
    a fluid-level monitoring fixture located within the at least one pipe adapter;
    a GPS receiver present within a structure attached to the at least one pipe adapter;
    a hygroscopic substance present within a structure attached to the at least one pipe adapter, and
    a connection for refilling the tote attached to the at least one pipe adapter;
    wherein the flexible pipe is in a y-configuration.

2. The cap of claim 1, further comprising a power source.

3. The cap of claim 1, wherein the hygroscopic substance is contained within a cartridge.

4. The cap of claim 1, wherein the fluid-level monitoring fixture is a differential pressure sensor.

5. The cap of claim 4, wherein the differential pressure sensor measures a difference between two pressures.

6. The cap of claim 4, wherein the differential pressure sensor is used to measure a fluid level of a fluid in the tote by comparing a pressure above the fluid and another pressure below the fluid.

7. The cap of claim 4, wherein the differential pressure sensor is configured to measure a flow rate of a fluid by measuring a pressure on a first side of a restriction and another pressure on a second side of the restriction as the fluid flows at least one of a) into the tote and b) out of the tote.

8. The cap of claim 4, wherein the differential pressure sensor measures a pressure difference across a filter.

9. The cap of claim 4, wherein the differential pressure sensor is located inside the tote.

10. The cap of claim 4, wherein the differential pressure sensor is located outside of the tote.

11. The cap of claim 1, wherein the cap comprises an O-ring.

12. The cap of claim 1, wherein the diameter of the at least one pipe adapter is selected from the group consisting of 2 inches, 1.75 inches, 1.5 inches, 1.25 inches, 1 inch, 0.75 inches, and 0.5 inches.

13. The cap of claim 1, wherein the at least one pipe adapter is comprised of polypropylene.

14. The cap of claim 1, wherein the at least one pipe adapter is comprised of polyvinyl chloride.

15. The cap of claim 1, wherein the fluid-level monitoring fixture is selected from the group consisting of sight glasses, current loops, floats, hydrostatic devices, load cells, magnetic level gauges, capacitance transmitters, time-of-flight measurements, ultrasound, radar, scales, and light.

16. The cap of claim 1, further comprising an antenna.

17. The cap of claim 1, further comprising a transmitter.

18. A method of utilizing the cap of claim 17, comprising:
    detecting a fluid level in the tote with the fluid level monitoring fixture;
    transmitting the fluid level via the transmitter;
    detecting a GPS location of the tote with the GPS receiver;
    transmitting the GPS location via the transmitter;
    receiving the fluid level with a receiver;
    receiving the GPS location with the receiver;
    monitoring the fluid level in the tote; and
    monitoring the GPS location of the tote.

19. The cap of claim 1, wherein the hygroscopic substance is configured to change color when the hygroscopic substance is consumed.

* * * * *